United States Patent [19] [11] 3,898,528
Runtsch et al. [45] Aug. 5, 1975

[54] ELECTRICAL CONNECTION AND PROTECTION DEVICE

[75] Inventors: Erhard Runtsch, Hemsbach; Volker Schmitt, Bammental, both of Germany

[73] Assignee: Brown, Boveri & Cie Aktiengesellschaft, Mannheim, Germany

[22] Filed: Sept. 21, 1973

[21] Appl. No.: 399,415

[30] Foreign Application Priority Data
Sept. 23, 1972 Germany............................ 2246845

[52] U.S. Cl. ............................... 317/18 D; 317/112
[51] Int. Cl. ............................................. H02h 1/02
[58] Field of Search ............. 317/18 D, 112; 335/18

[56] References Cited
UNITED STATES PATENTS
3,636,482 1/1972 Edmunds .......................... 317/18 D
3,717,792 2/1973 Gryctko ............................ 317/18 D

*Primary Examiner*—G. Harris
*Attorney, Agent, or Firm*—Toren, McGeady and Stanger

[57] ABSTRACT

An electrical connection and protection device suitable for conventional wall installation, which device includes circuit breaker features, is provided with a housing box for accommodating a circuit breaker as well as ground fault sensing means. The housing box allows for a compact arrangement in which all such functions can be combined in a nearly conventional wall receptacle arrangement.

9 Claims, 9 Drawing Figures

SUMMATION CURRENT TRANSFORMER
(Mounted Spatially with 2)

ELECTRICAL CONNECTION AND PROTECTION DEVICE

BACKGROUND OF THE INVENTION

This invention relates to electrical connection and protection devices of the type carried in a wall receptacle, outlet, or socket, and particularly of the type having a circuit breaker.

Combining a fault current (ground current) circuit breaker and a wall receptacle in a common housing is well known. (See German utility model 1,804,365). It is also known that a line circuit breaker and a wall socket can be advantageously mounted in a single housing. (See German Pat. No. 464,426). Furthermore, there exist automatic cutouts which provide an electromagnetic and thermal release having an additional fault current circuit breaker, wherein the two windings for the electromagnetic release and the fault current release are arranged on one release or trip magnet. (See German Patent No. 1,178,142).

Though fault current protection circuits have been known for a long time, and fault current circuit breakers have been used both in connection with wall sockets and in connection with power switches, combinations of these devices have not been produced in larger quantities in the past, because each must meet different requirements for comprehensive electrical protection. In particular, with diversification and more widespread use of electrical networks, the requirements regarding short circuit switching power become increasingly stringent. On the other hand, the sensitivity of the fault current release must be constantly increased because of the desire for simplified grounding conditions. Due to these requirements, present means for producing such combination circuit breakers would have to be so large that their manufacture and installation in buildings would be cumbersome and expensive.

For these reasons, power switches with high short circuit switching power and high sensitivity fault current circuit breakers have hitherto been arranged as special switching gear in an electrical installation, and the respective wall sockets were arranged and connected separately. The assembly costs for such electrical installations are very high and represent an unfavorable ratio to the cost of the overall electrical system. This is especially so when a single load must be provided with exactly adapted circuit breakers having excess current and fault current protection.

An object of this invention is to remedy the aforementioned disadvantages of electrical connection and protection devices.

Another object of this invention is to provide a device which can be inexpensively manufactured and easily installed.

Still another object of this invention is to provide such a device which is adaptable to conventional electrical wiring installations.

Another object of this invention is to provide a device which exhibits high sensitivity to ground faults yet without degradation of sensitive parts when high short circuit currents are generated.

Another object of the invention is to combine a wall socket with a circuit breaker with high short circuit switching power and sensitive fault current release into a single unit with small dimensions.

SUMMARY OF THE INVENTION

According to a feature of the invention, these objects are attained in whole or in part, with an electrical connection and protection device having a wall socket and a circuit breaker for fault current and excess line current, characterized in that a switching mechanism with an actuating element and a test key, a double contact point, a release magnet, and two windings, as well as electronic switching means for applying a voltage to the windings are arranged in a single housing box; and that connector receptacles of the wall socket are arranged in a cover which closes the front of the housing box.

By virtue of these features, a high-grade compact circuit breaker can be produced at relatively low cost. Due to the electronic switching means, an external voltage, for example, the voltage at the mains, is connected through one of the release windings when a predetermined fault current is exceeded.

According to another feature of the invention, electronic switching means amplify the fault current and the resulting signal is applied to the release windings when it exceeds a predetermined value. The amplification of the switching means is adapted to the two response values of the magnetic release. It is also possible to regulate the external voltage and the respective circuits.

According to another feature of the invention, the housing box has a rectangular or parallelepiped shape and the outlet socket and electronic circuit means held by the cover are superposed in one narrow end of the housing box. The switching mechanism and the release magnet are arranged in two symmetrical arcing chambers superposed in the space adjoining the other end.

According to another feature of the invention, the desired high short circuit switching power is achieved by coupling the armature of the release magnet mechanically with moving contact studs so that, by vigorous movement of the armature, a speedy or accelerating opening force is exerted directly on the contact studs.

According to another feature of the invention, one winding of the release magnet is composed of an insulated flat band whose width is equal to the entire magnet length and which, at the same time, forms the carrier for the second winding. This winding of an insulated flat band replaces the coil form and simplifies and reduces the size of the switch gear.

According to another feature of the invention, the spring for biasing the armature of the release magnet is arranged inside the release magnet between the fixed core and the armature.

According to another feature of the invention, another wall box with a fastening flange and a somewhat greater depth than corresponds to the housing box is provided, to receive the housing box so that a free space for receiving the feed connections is formed between the bottom of the wall box and the bottom of the housing box.

The various features of novelty which characterize the invention are pointed out with particularlity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRITPION OF THE DRAWINGS

DETAILED DESCRIPTION OF PREFERRED EMBODIMENTS

Figure 1:
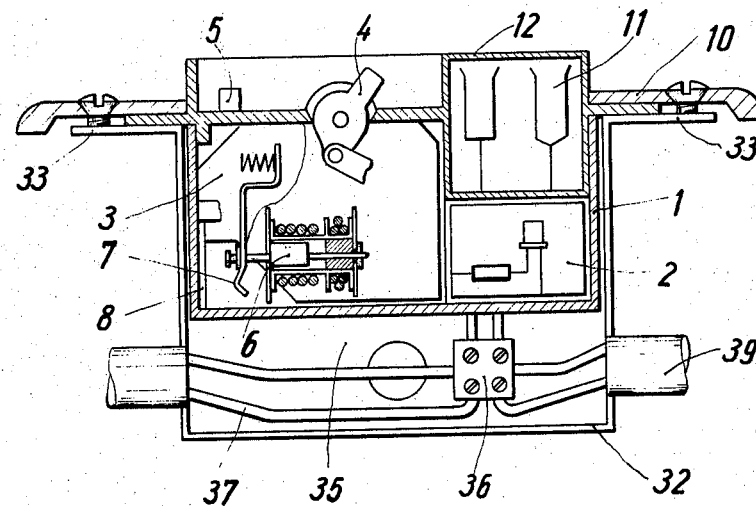
FIG. 1 is a sectional view along the lines I—I of FIG. 3 illustrating an embodiment of this invention.
Figure 2:
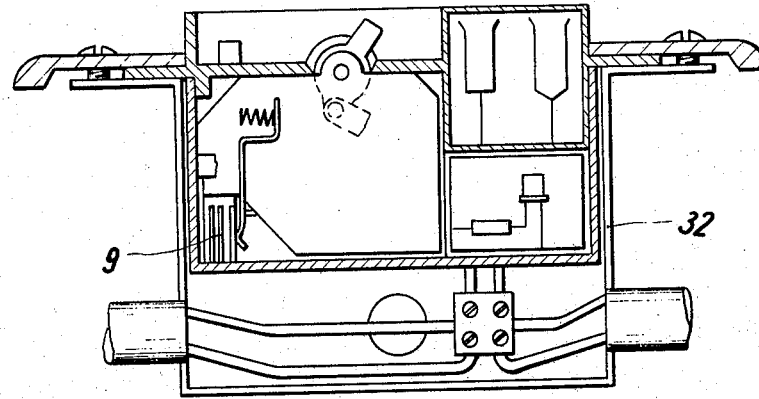
FIG. 2 is another sectional view along the line II—II of FIG. 3.
Figure 3:
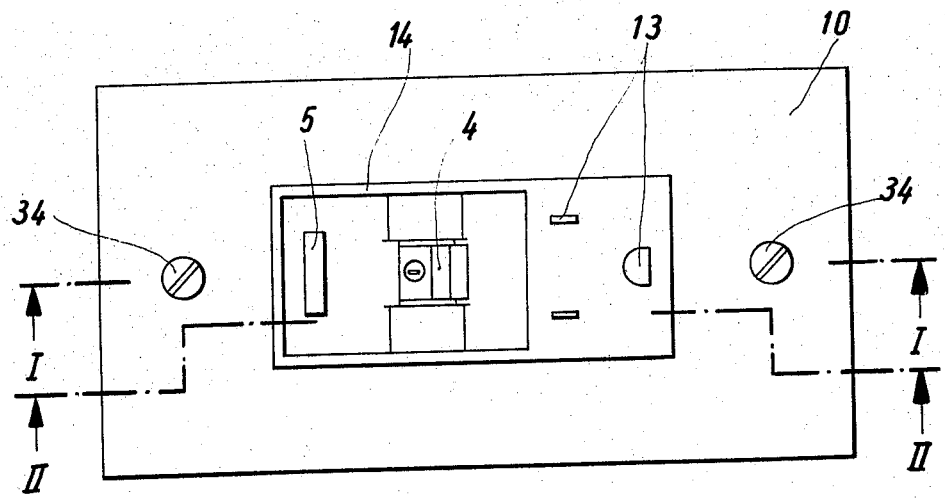
FIG. 3 is a top view of one embodiment of the invention.

The embodiment according to FIGS. 1, 2 and 3, shows a rectangular housing box which contains various components of this invention, namely an electronic circuit means 2, a switching mechanism 3 with a control element 4 and a test key 5, a magnetic release or disconnect 6, which is arranged along the center axis of the device, two moving contact levers 7 associated with a double contact point, which oppose fixed contact studs 8 and move together with several quenching sheets 9 therebetween for arcing chambers arranged symmetrically next to the magnetic release 6.

Inside a cover 10 a raised portion 12 encloses connector jacks 11 forming the wall socket or receptacle. A plug is applied by inserting it through slots 13 of the cover. The raised portion 12 has about the same width as the housing box 1. A circumferential edge 14 having the same height as the raised portion 12 is formed thereon and together with the portion 12 has about the same dimension as the housing box 1. Inside the edge 14 are contained in the cover 10 two apertures to accommodate the control element 4 and the test key 5.

Two embodiments of the magnetic release or disconnect mechanism according to the invention are described with reference to FIGS. 7 and 8. The mechanism has a fixed core 15 and a moving armature 16. A compression spring 17 holds the armature 16 in the position shown. A suitable current flow in one of the two windings 18 and 19 or one of the two windings 20 and 21 moves the armature 16 toward the core 15. This displaces a pin 22 toward a U-shaped member 23 which release the latching of the switching mechanism. On the core 16 a bolt 24 with a lug 25 exerts an accelerating or rapid opening force directly on the contact studs 8 when the armature 16 is attracted.

Figure 5:
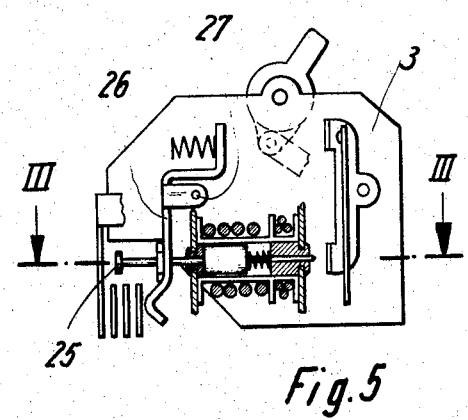
FIG. 5 is a top view of the switching mechanism with the release magnet and the two arching chambers of the double contact point.
Figure 7:
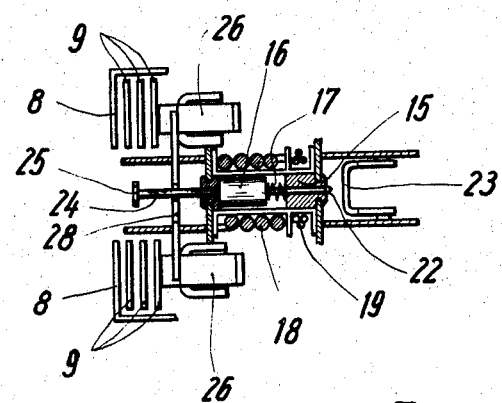
FIG. 7 is a sectional view along lines III—III of FIG. 5.

This process is described more fully with respect to FIGS. 5 and 7. Two moving contact levers 26 are arranged laterally of the switching mechanism 3 and mounted rotatably on an axle 27. A plate 28 is attached on the bolt 24 and transmits an impact from the lug 25 to the two moving contact levers 26 when the armature 16 is attracted.

Figure 6:
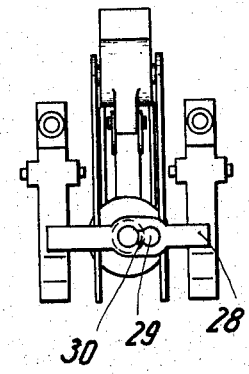
FIG. 6 is an end view of the switching mechanism of FIG. 5.

The arrangement and the support of the plate 28 are shown in FIG. 6 in another view. The plate 28 has a hole 29 the size of the lug 25 for attachment on the bolt 24 and a slot 30 of the width of the bolt 24, so that the plate can be secured without special fastening means by pushing it over the bolt and displacing it laterally.

Figure 8:
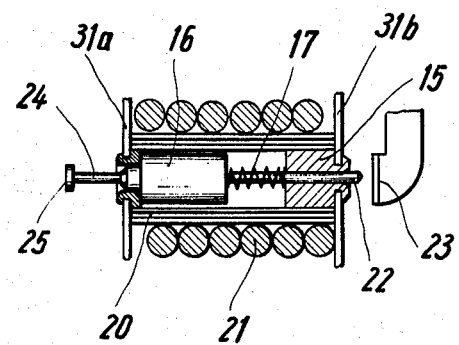
FIG. 8 shows a magnetic release with a flat band coil which serves as the carrier for the second winding.

FIG. 8 shows an embodiment of the release magnet where one winding 20 consists of insulated flat-band or ribbon material. This winding is generally the short circuit disconnect or trip winding traversed by the main or line current. The width of the flat band of the winding 20 corresponds to the length of the release magnet, that is, to the distance of the two yoke plates 31a and 31b.

For the installation of the device in a wall, as shown in FIGS. 1 and 2, use is made of a wall box 32 which is equipped with flanges 33 on which the combination is secured with screws 34. The wall box 32 has a greater depth than the housing box 1. A chamber 35 is thus formed between the bottom of the wall box 32 and the bottom of the housing box 1, in which the terminals 36 and the feed wires 37 are arranged. The side walls of the chamber 35 form openings 38 or corresponding depressions or "knock-outs" for the subsequent production of these openings so that cables or ducts 39 can be connected.

Figure 4:
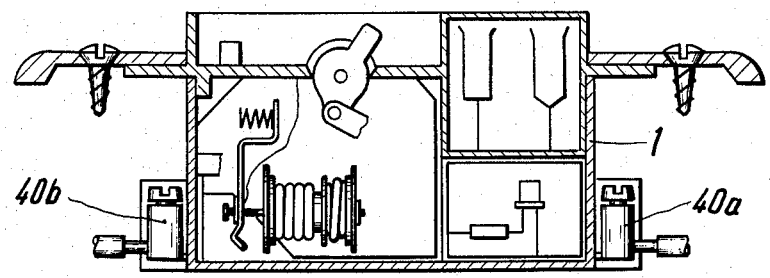
FIG. 4 is a sectional view of another embodiment of this invention without a wall box, but with terminals.

Another embodiment of the invention without a wall box is shown in FIG. 4. In this embodiment terminals 40a and 40b are arranged directly on the housing box 1. Such an embodiment is suitable for assembly on a switch board or in a larger housing.

The arrangement of the various parts is preferably so selected that good utilization of the space is obtained and only few and short connecting lines are necessary between the parts. As can be seen from FIGS. 1, 2 and 4, the connector boxes 11 and the electronic switching means 2 held in the cover 10 are mutually superposed on one narrow side of the housing box 1, while the switching mechanism 3 and the release magnet 6 are mutually superposed in the space adjoining the other narrow side. As can be seen in the top view according to FIG. 7, the two arcing chambers with the quenching plates 9 are arranged next to the release magnet. This arrangement has the effect of preventing the sparks formed in the arcing chambers from causing damage to parts of the connection and protection device, even under a high short circuit load. This is so because the arcing chambers are far removed from sensitive parts, are under the influence of the magnetic fields of the magnetic release, and are opened quickly by the direct action of the accelerating force of the armature thus forming a type of arc suppression means.

The term wall box as used herein is used in the sense of junction box. The switching means referred to herein may be substituted by any type of circuit means, such as comparators and amplifiers, which perform the desired functions.

It will be recognized that in FIG. 7 one of the windings 18 and 19 responds to fault currents and the other to excess line currents.

Figure 9:
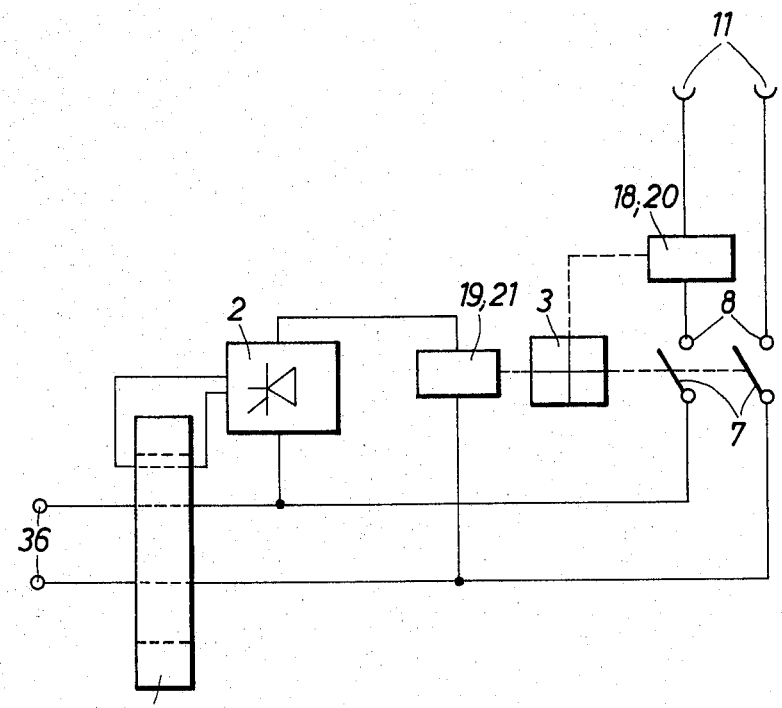
FIG. 9 shows the electrical connections of the protective device.

FIG. 9 is a diagram illustrating the electrical interconnection between the elements of the apparatus in the remaining figures.

While specific embodiments of the invention have been shown and described in detail to illustrate the application of the inventive principles, it will be understood that the invention may be embodied otherwise without departing from such principles.

What is claimed is:

1. An electrical connection and protection device for use with an electrical socket, comprising a housing box, a switching mechanism in the housing box for disconnecting power to the housing box, said switching mechanism having a control element and testing means; said housing box enclosing a double contact point for making and breaking connections, a disconnect magnet coupled to the double contact point and having a fixed core and a moving armature, electronic circuit means responsive to external currents and coupled to said windings for energizing at least one of the windings in response to the currents; a socket having a connector jack, a cover for holding said connector jack and covering the housing.

2. An electrical connection and protection device according to claim 1, wherein said housing box has the form of a parallelepiped, the connector receptacles and the electronic switching means held by said cover are superposed on one narrow end thereof, while the switching mechanism and the release magnet are arranged in the space adjoining another narrow end thereof, and two arcing chambers associated with the double contact point are arranged next to the release magnet.

3. An electrical connection and protection device according to claim 1 wherein said release magnet mechanism includes contact studs, said armature being coupled mechanically with the moving contact studs so that an accelerating opening force is exerted directly on the contact studs when the armature is released.

4. An electrical connection and protection device according to claim 1 wherein one winding of the release magnet comprises an insulated flat band whose width corresponds to the entire length of the release magnet and which forms the carrier for the second winding of said pair of windings.

5. An electrical connection and protection device according to claim 3 wherein said release magnet mechanism includes a spring for fixing the armature being arranged inside the release magnet between the fixed core and the moving armature of the magnet.

6. An electrical connection and protection device according to claim 1 comprising a wall box with fastening flanges and having a greater depth than the housing box, the housing box being inserted into said wall box and a cavity for receiving terminals and feed wires is formed between the bottom of the wall box and the bottom of the housing box.

7. In an electrical connection and protection device having a conventional wall electrical housing box and receptacle means for receiving a conventional plug, the improvement comprising that said housing box is compartmentalized and includes a circuit breaker for disconnecting electrical power to said receptacle means, a switching mechanism for operating said circuit breaker, and an electronic switching means responsive to a change in current level indicating a fault for disconnecting a voltage from said switching mechanism so as to change the condition of the circuit breaker.

8. The device of claim 7, wherein said switching mechanism includes a control element and testing means, contact means coupled to said receptacle means for making and breaking connections, and a disconnect magnet coupled to the contact means and having a fixed core and a moving armature.

9. The device of claim 7, wherein said switching mechanism comprises arc suppression means, said arc suppression means being physically remote from said electronic switching means.

* * * * *